US011152009B1

(12) United States Patent
Adams (10) Patent No.: US 11,152,009 B1
(45) Date of Patent: *Oct. 19, 2021

(54) ROUTING NATURAL LANGUAGE COMMANDS TO THE APPROPRIATE APPLICATIONS

(71) Applicant: Amazon Technologies, Inc., Seattle, WA (US)

(72) Inventor: Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,638

(22) Filed: Aug. 14, 2017

Related U.S. Application Data

(63) Continuation of application No. 13/528,529, filed on Jun. 20, 2012, now Pat. No. 9,734,839.

(51) Int. Cl.
*G10L 15/26* (2006.01)
*G10L 21/00* (2013.01)
(Continued)

(52) U.S. Cl.
CPC .............. *G10L 21/00* (2013.01); *G06F 17/00* (2013.01); *G06F 40/20* (2020.01); *G10L 15/00* (2013.01);
(Continued)

(58) Field of Classification Search
CPC ......... G10L 21/00; G10L 15/00; G06F 17/27; G06F 17/00
(Continued)

(56) References Cited

U.S. PATENT DOCUMENTS 5,632,002 A * 5/1997 Hashimoto ............. G06F 3/165
704/231
6,076,061 A * 6/2000 Kawasaki ............... G06F 3/165
704/270
(Continued)

FOREIGN PATENT DOCUMENTS

WO   WO2011088053   7/2011

OTHER PUBLICATIONS

Office action for U.S. Appl. No. 13/528,529, dated Feb. 19, 2014, Adams, "Routing Natural Language Commands to the Appropriate Applications", 13 pages.
(Continued)

*Primary Examiner* — Seong-Ah A Shin
(74) *Attorney, Agent, or Firm* — Lee & Hayes, P.C.

(57) ABSTRACT

In a voice controlled system, multiple applications are configured to respond to various commands. The voice controlled system includes client devices and servers. The correct application to receive a natural language command is identified based on how well the command matches functions of the application. A target application to receive the command may additionally be selected based on which application is most likely to receive a command. Likelihood of an application receiving a command may be determined by considering context. The command may be a voice input to a client device that is analyzed by speech recognition technology to determine word strings representing possible commands. Thus, the selection of a target application to receive the command may be based on word strings from the natural language input, a closeness of fit between the command and an application, and/or the likelihood an application is the target for the next incoming command.

21 Claims, 6 Drawing Sheets

(51) Int. Cl.
*G10L 15/22* (2006.01)
*G06F 17/00* (2019.01)
*G10L 15/00* (2013.01)
*G06F 40/20* (2020.01)

(52) U.S. Cl.
CPC ........ *G10L 15/22* (2013.01); *G10L 2015/223* (2013.01); *G10L 2015/228* (2013.01)

(58) Field of Classification Search
USPC ............................................ 704/9, 231, 275
See application file for complete search history.

(56) References Cited

U.S. PATENT DOCUMENTS

| | | | | |
|---|---|---|---|---|
| 6,233,559 | B1* | 5/2001 | Balakrishnan | G06F 9/451 704/275 |
| 7,272,561 | B2* | 9/2007 | Miyazaki | G10L 15/142 704/256 |
| 7,418,392 | B1* | 8/2008 | Mozer | G10L 15/26 315/307 |
| 7,720,683 | B1* | 5/2010 | Vermeulen | G10L 15/22 704/254 |
| 7,774,204 | B2* | 8/2010 | Mozer | G10L 15/26 315/307 |
| 7,813,822 | B1* | 10/2010 | Hoffberg | G06K 9/00369 381/73.1 |
| 7,949,536 | B2* | 5/2011 | Mowatt | G10L 15/193 704/275 |
| 8,106,750 | B2* | 1/2012 | Cho | G08C 23/04 340/12.5 |
| 8,589,157 | B2* | 11/2013 | Ju | G10L 15/22 704/235 |
| 8,914,277 | B1* | 12/2014 | Liu | G06F 17/271 704/10 |
| 9,043,349 | B1* | 5/2015 | Lin | G06K 9/6292 707/758 |
| 2001/0041980 | A1* | 11/2001 | Howard | G10L 15/1822 704/270 |
| 2002/0002453 | A1* | 1/2002 | Lazaridis | G06F 17/2765 704/9 |
| 2003/0088421 | A1* | 5/2003 | Maes | G10L 15/30 704/270.1 |
| 2006/0106614 | A1* | 5/2006 | Mowatt | G10L 15/18 704/275 |
| 2006/0116877 | A1* | 6/2006 | Pickering | G10L 15/08 704/231 |
| 2007/0043569 | A1* | 2/2007 | Potter, III | G06F 9/4443 704/270 |
| 2007/0061067 | A1* | 3/2007 | Zeinstra | G10L 15/26 455/563 |
| 2007/0143115 | A1* | 6/2007 | Falcon | G10L 15/22 704/270.1 |
| 2009/0030687 | A1* | 1/2009 | Cerra | G10L 15/065 704/243 |
| 2009/0299745 | A1 | 12/2009 | Kennewick et al. | |
| 2010/0175020 | A1* | 7/2010 | Kim | H04M 1/72403 715/783 |
| 2010/0312547 | A1* | 12/2010 | Van Os | G10L 15/26 704/9 |
| 2011/0153324 | A1* | 6/2011 | Ballinger | G10L 15/26 704/235 |
| 2011/0161077 | A1* | 6/2011 | Bielby | G10L 15/32 704/231 |
| 2012/0016678 | A1* | 1/2012 | Gruber | G10L 13/02 704/275 |
| 2012/0035924 | A1* | 2/2012 | Jitkoff | G10L 15/1815 704/235 |
| 2012/0173244 | A1* | 7/2012 | Kwak | G10L 15/22 704/275 |
| 2012/0223885 | A1* | 9/2012 | Perez | G06F 3/011 345/158 |
| 2012/0323557 | A1* | 12/2012 | Koll | G06F 17/276 704/8 |
| 2013/0033643 | A1* | 2/2013 | Kim | H04N 21/44218 348/563 |
| 2013/0041665 | A1* | 2/2013 | Jang | H04N 21/478 704/246 |
| 2013/0073293 | A1* | 3/2013 | Jang | G10L 15/22 704/275 |
| 2013/0300546 | A1* | 11/2013 | Kim | G08C 17/02 340/12.22 |
| 2014/0222419 | A1* | 8/2014 | Romano | G06F 16/367 704/10 |
| 2014/0358544 | A1* | 12/2014 | Printz | G10L 15/19 704/254 |
| 2015/0142447 | A1* | 5/2015 | Kennewick | G10L 15/22 704/275 |
| 2016/0180853 | A1* | 6/2016 | VanLund | G10L 17/22 704/275 |

OTHER PUBLICATIONS

Office action for U.S. Appl. No. 13/528,529, dated Dec. 12, 2016, Adams, "Routing Natural Language Commands to the Appropriate Applications", 19 pages.
Office Action for U.S. Appl. No. 13/528,529, dated Mar. 13, 2015, Jeffrey P. Adams, "Routing Natural Language Commands to the Appropriate Applications", 16 pages.
Office action for U.S. Appl. No. 13/528,529, dated Apr. 18, 2016, Adams, "Routing Natural Language Commands to the Appropriate Applications", 19 pages.
Office action for U.S. Appl. No. 13/528,529, dated Aug. 27, 2015, Adams, "Routing Natural Language Commands to the Appropriate Applications", x pages.
Office action for U.S. Appl. No. 13/528,529, dated Sep. 10, 2014, Adams, "Routing Natural Language Commands to the Appropriate Applications", 16 pages.
Pinhanez, "The Everywhere Displays Projector: A Device to Create Ubiquitous Graphical Interfaces", IBM Thomas Watson Research Center, Ubicomp 2001, 18 pages.

* cited by examiner

ROUTING NATURAL LANGUAGE COMMANDS TO THE APPROPRIATE APPLICATIONS

This Application is a continuation of U.S. patent application Ser. No. 13/528,529 filed on Jun. 20, 2012, which is now issued as U.S. Pat. No. 9,734,839 and incorporated herein by reference.

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech.

The use of natural language input to interact with computing devices presents many challenges. One challenge concerns identifying the correct application to receive the input. Some devices, such as personal computers, smart phones, personal digital assistants, tablets, and such may have multiple applications that each act on commands provided by a user. The user may select an application to receive a command by clicking on a window, pressing an application icon on a touch screen, or otherwise explicitly indicating which application is the intended target for a command. However, if a user gives natural language commands to a computing device without indicating which application should receive and process the command the computing device may be unable to act on the command.

Accordingly, there is a need for techniques to address disambiguation of the correct target application for commands that are not directed to a specific application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Many computing devices presently require users to explicitly indicate which application on the device they wish to use. In graphically-based interfaces, users may select an active application by clicking on a window, selecting the application from a list, or otherwise affirmatively selecting the active application. However, as human-machine interfaces evolve, users may provide natural language commands to the device itself without the step of specifying which application is to act on a command. Voice interactions are one type of natural language command. Thus, a user may talk to a computing device and expect the device to appropriately act on his or her spoken commands. Natural language commands are not limited to speech and may also be provided as typed commands, handwritten commands, etc.

Natural language commands can explicitly indicate the application that is to act on the command. For example, a user may say "Open clock. What time is it?". However, this may become tedious and can distract from the user experience. If the device can figure out which application should receive a command, the user is then able to interact with the device without needing to explicitly designate an application for each command. Each application available to the device may include a model for interpreting how well a given command fits with the functionalities of the application. Specifically, if an application is presented with a command, the application can return a score representing the likelihood that it is the intended target for the command. The model in an application can generally determine if a command "makes sense" for the application. For example, the command "What time is it?" may receive a high score from a clock application but a low score from a music playing application.

If the given command only makes sense for one application, the individual applications scores may be sufficient to determine which application will receive the command. However, there may be instances in which multiple applications can interpret and act on a command. For example, the command "Play Star Wars" may be equally applicable to a movie player, a music player, and a gaming application. Identifying which application is most likely to receive a command at any point in time may help to disambiguate between applications that can all act on a command without knowing what command is coming next, it is possible to infer which application is most likely to receive the next command. For example, if the last 10 commands were to play music, then there is a high probability that the next incoming command will also be directed to the music player. Similarly, if the user rarely plays computer games before noon and the current time is 10:00 AM then the gaming application and has a low probability of being the target for a command.

Thus, by determining how likely various applications are to be the targets of any subsequent command and by testing the "fit" of a received command with each of the applications it is possible to route the command to the application that is the most probable target. Illustrative implementations for identifying the correct target application of a natural language command are described below. However, the described techniques may be implemented in many other contexts and situations in which a user provides commands to a computing device.

A score may represent a probability or another quantity that provides an indication of a match or a correspondence. For example, a score may be, without limitation, a probability in the range of zero to one, a probability represented as a percentage, a log probability, or a likelihood. For example, as noted above, a score may indicate a match or correspondence between a received command and commands that an application understands how to process.

In some embodiments, scores and probabilities may be combined to create a new score or probability. For example, a probability that an application is the next application to receive a command may be combined with a score that indicates how well a received command matches commands understood by an application. The combination of the score and the probability may be represented as another score or a probability.

Illustrative Device

Figure 1:
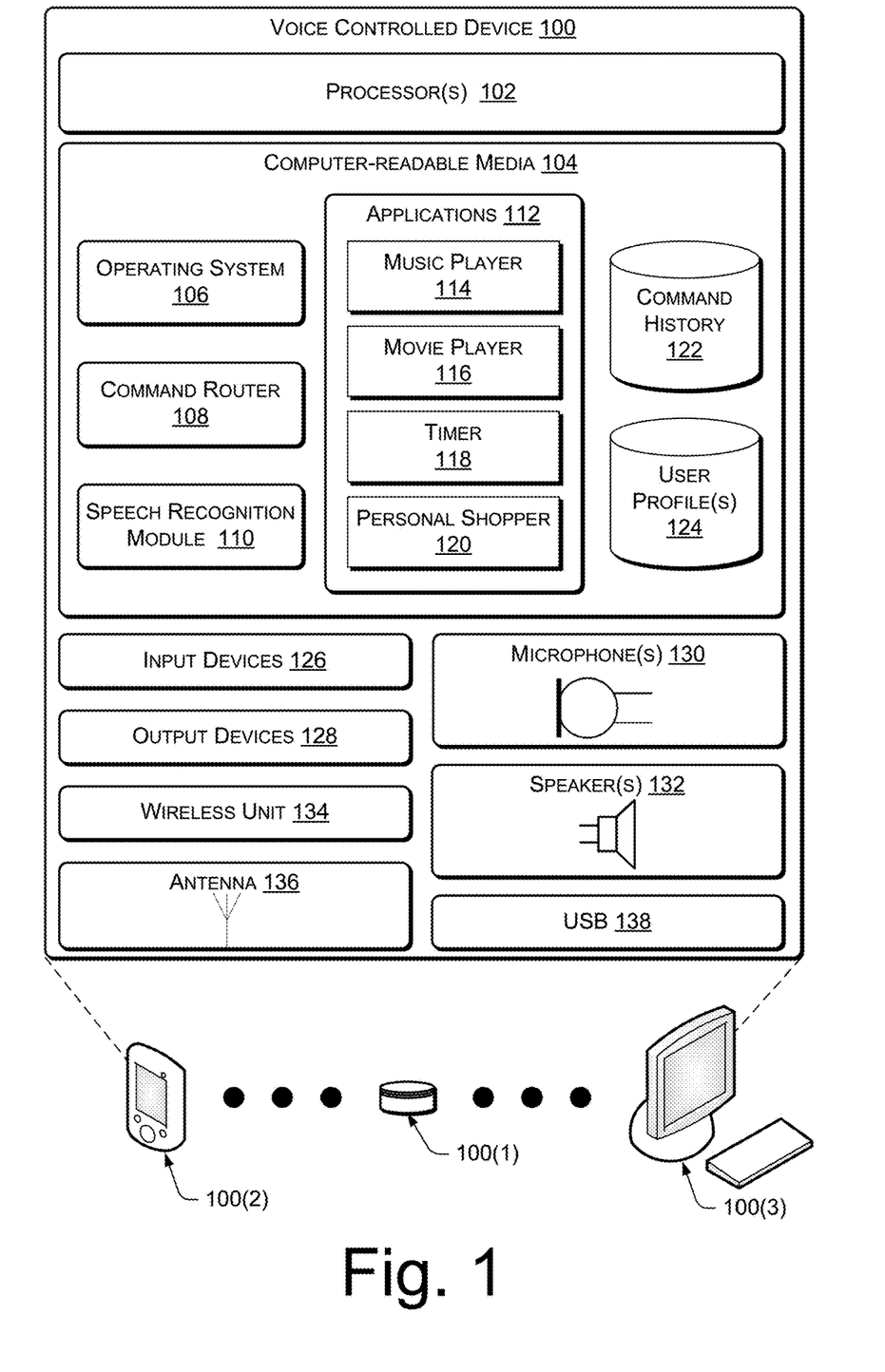
FIG. 1 shows a functional block diagram of selected components implemented at a voice controlled device.

FIG. 1 shows selected functional components of a voice controlled device 100. The voice controlled device 100 may be implemented as a standalone device 100(1) that is relatively simple in terms of functional capabilities with limited input/output components, memory, and processing capabilities. For instance, the voice controlled device 100(1) does not have a keyboard, keypad, or other form of mechanical input. Nor does it have a display or touch screen to facilitate visual presentation and user touch input. Instead, the device 100(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 100(1) is through voice input and audible output.

The voice controlled device 100 may also be implemented as a mobile device 100(2) such as a smart phone or personal digital assistant. The mobile device 100(2) may include a touch-sensitive display screen and various buttons for providing input as well as additional functionality such as the ability to send and receive telephone calls. Alternative implementations of the voice control device 100 may also include configuration as a personal computer 100(3). The personal computer 100(3) may include a keyboard, a mouse, a display screen, and any other hardware or functionality that is typically found on a desktop, notebook, netbook, or other personal computing devices.

In the illustrated implementation, the voice controlled device 100 includes one or more processors 102 and computer-readable media 104. The computer-readable media 104 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 104 may be implemented as computer-readable storage media ("CRSM"), which may be any available physical media accessible by the processor(s) 102 to execute instructions stored on the memory 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 102.

Several modules such as instruction, datastores, and so forth may be stored within the computer-readable media 104 and configured to execute on the processor(s) 102. A few example functional modules are shown as applications stored in the computer-readable media 104 and executed on the processor(s) 102, although the same functionality may alternatively be implemented in hardware, firmware, or as a system on a chip (SOC).

An operating system module 106 is configured to manage hardware and services within and coupled to the device 100 for the benefit of other modules. A command a router 108 is configured to route incoming commands to an appropriate application. A speech recognition module 110 may employ any number of conventional speech recognition techniques such as use of natural language processing and extensive lexicons to interpret voice input.

The voice controlled device 100 may also include a plurality of applications 112 stored in the computer-readable media 104 or otherwise accessible to the device 100. In this implementation, the applications 112 are a music player 114, a movie player 116, a timer 118, and a personal shopper 120. However, the voice controlled device 100 may include any number or type of applications and is not limited to the specific examples shown here. The music player 114 may be configured to play songs or other audio files. The movie player 116 may be configured to play movies or other audio visual media. The timer 118 may be configured to provide the functions of a simple timing device and clock. The personal shopper 120 may be configured to assist a user in purchasing items from web-based merchants.

Datastores present include a command history 122 of past commands that have been received by the voice control device 100 and one or more user profiles 124 of users that have interacted with the device 100. The command history 122 may include a record of commands received, dates and times when those commands were received, a user that generated the respective commands, target applications for the commands, as well as other information related to past commands. The user profile(s) 124 may include user characteristics, preferences, usage history, library information (e.g., music play lists), online purchase history, and other information specific to an individual user.

Generally, the voice controlled device 100 has input devices 126 and output devices 128. The input devices 126 may include a keyboard, keypad, mouse, touch screen, joystick, control buttons, etc. Specifically, one or more microphones 130 may function as input devices to receive audio input, such as user voice input. The output devices 128 may include a display, a light element (e.g., LED), a vibrator to create haptic sensations, or the like. Specifically, one a more speakers 132 may function as output devices to output audio sounds.

A user may interact with the device 100 by speaking to it, and the microphone 130 captures the user's speech. The device 100 can communicate back to the user by emitting audible statements through the speaker 132. In this manner, the user can interact with the voice controlled device 100 solely through speech, without use of a keyboard or display.

The voice controlled device 100 might further include a wireless unit 134 coupled to an antenna 136 to facilitate a wireless connection to a network. The wireless unit 134 may implement one or more of various wireless technologies, such as wifi, Bluetooth, RF, and so on. A USB 138 port may further be provided as part of the device 100 to facilitate a wired connection to a network, or a plug-in network device that communicates with other wireless networks. In addition to the USB port 138, or as an alternative thereto, other forms of wired connections may be employed, such as a broadband connection.

Accordingly, when implemented as the primarily-voice-operated device 100(1), there are no input devices, such as navigation buttons, keypads, joysticks, keyboards, touch screens, and the like other than the microphone(s) 130. Further, there is no output such as a display for text or graphical output. The speaker(s) 132 is the main output device. In one implementation, the voice controlled device 100(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 100(1) may be implemented as an aesthetically appealing device with smooth and rounded surfaces, with one or more apertures for passage of sound waves. The device 100(1) may merely have a power cord and optionally a wired interface (e.g., broadband, USB, etc.). Once plugged in, the device may automatically self-configure, or with slight aid of the user, and be ready to use. As a result, the device 100(1) may be generally produced at a low cost. In other implementations, other I/O components may be added to this basic model, such as specialty buttons, a keypad, display, and the like.

Figure 2:
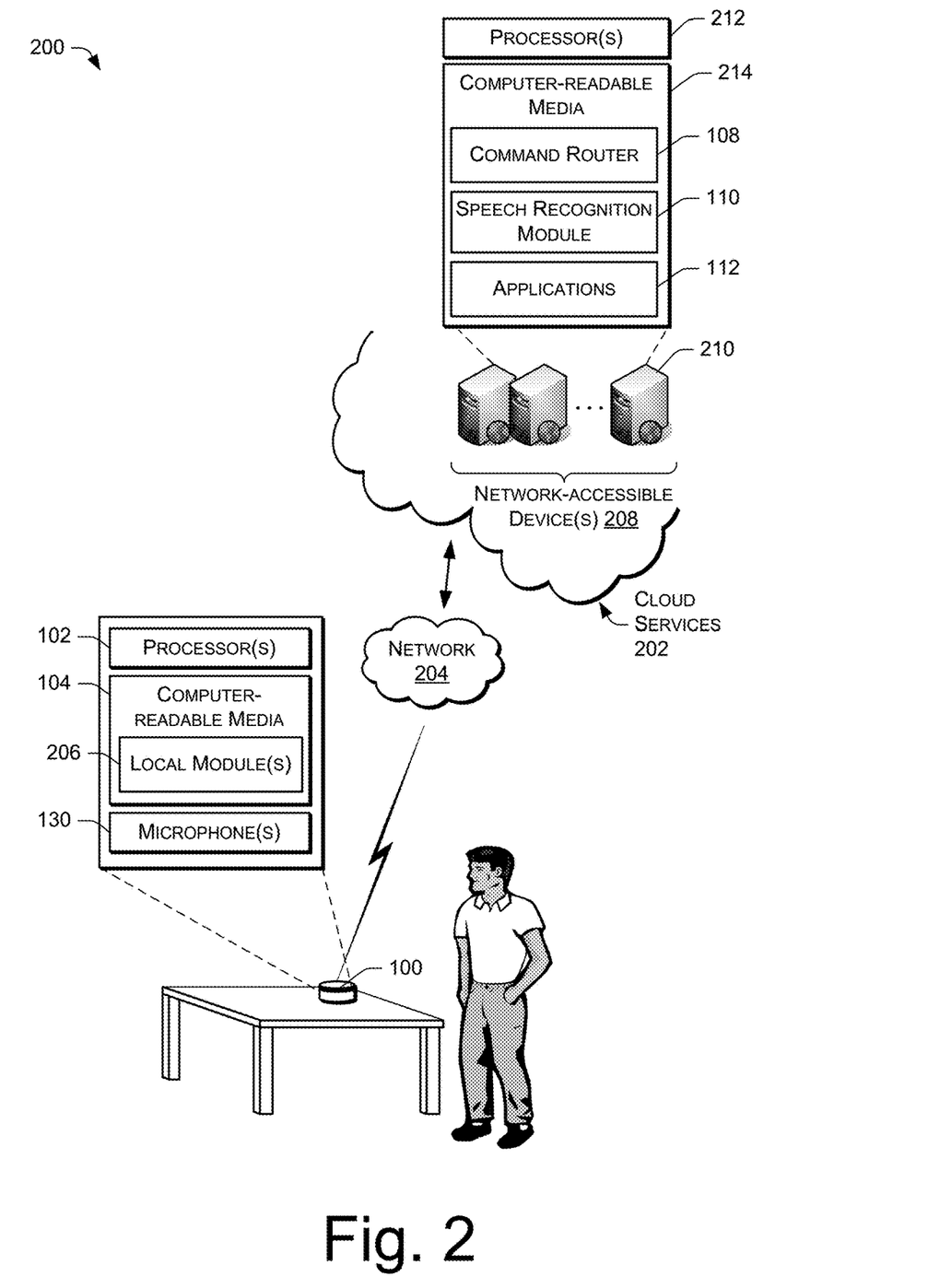
FIG. 2 shows a functional block diagram of selected components implemented at remote cloud services accessible via a network.

FIG. 2 is an architecture 200 showing an alternative implementation of the device 100 in which some or all of the functional components of the device 100 are provided by cloud services 202. The cloud services 202 generally refer to a network accessible platform implemented as a computing infrastructure of processors, storage, software, data access, and so forth that is maintained and accessible via a network 204 such as the Internet. Cloud services 202 do not require end-user knowledge of the physical location and configuration of the system that delivers the services. Common expressions associated with cloud services include "on-demand computing", "software as a service (SaaS)", "platform computing", "network accessible platform", and so forth.

In this implementation, the device 100 may be configured with one or more local modules 206 available in the computer-readable media 104 that provide instructions to the processor(s) 102. The local modules 206 may provide basic functionality such as creating a connection to the network 204 and initial processing of data received from the microphone 130 and controlling an output device such as a speaker. Other functionality associated with the device and system described in FIG. 1 may be provided by the remote cloud services 202.

The cloud services 202 include one or more network-accessible devices 208, such as servers 210. The servers 210 may include one or more processors 212 and computer-readable media 214. The processor(s) 210 and the computer-readable media 212 of the servers 210 are physically separate from the processor(s) 102 and computer-readable media 104 of the device 100, but may function jointly as part of a system that provides processing and memory in part on the device 100 and in part on the cloud services 202. These servers 210 may be arranged in any number of ways, such as server farms, stacks, and the like that are commonly used in data centers.

Furthermore, the command router 108, the speech recognition module 110, and/or any of the applications 112 shown in FIG. 1 may alternatively be located in the computer-readable media 214 of the cloud services 202. Thus, the specific location of the respective modules used to implement the features contained in this disclosure is not limiting and the discussions below are equally applicable to any implementation that includes a local device, a cloud-based service, or combinations thereof.

Figure 3:
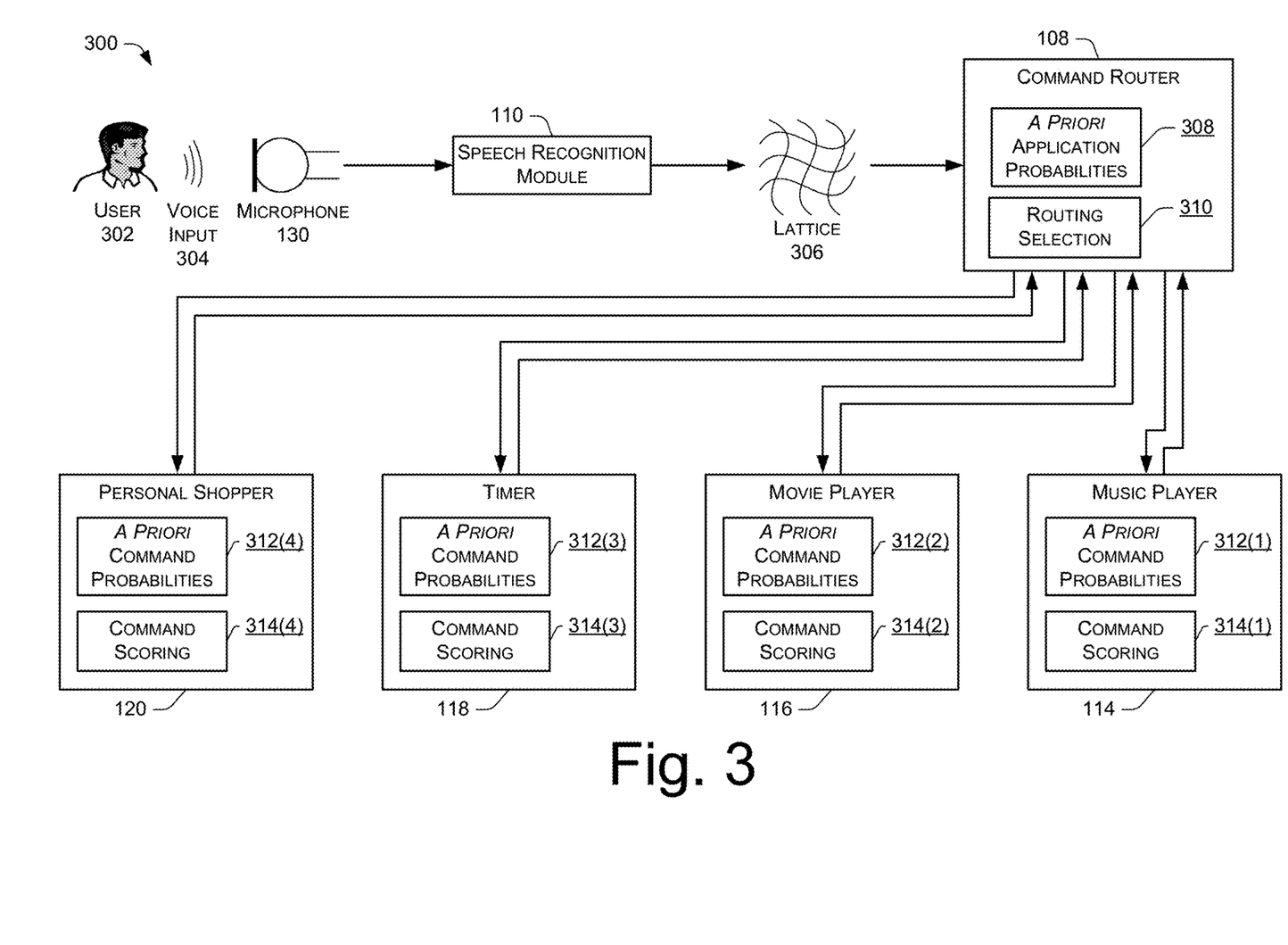
FIG. 3 shows selected components of the voice controlled device and data flow among those components.

FIG. 3 shows an illustrative data flow 300 among components of the voice controlled device 100 of FIG. 1. A user 302 provides voice input 304 that is received by the microphone 130. The microphone 130 provides a signal representing the voice input 304 to the speech recognition module 110. The speech recognition module 110 applies speech recognition techniques to the signal to identify words represented by the voice input 304. The speech recognition module 110 may output a word string or multiple possible word strings each with an associated probability based on the speech recognition algorithm applied to the voice input 304. Thus, rather than representing the voice input 304 as a single word string that is the "correct" interpretation of the voice input 304, the speech recognition module 110 may provide multiple possible interpretations of the voice input 304.

Figure 4:
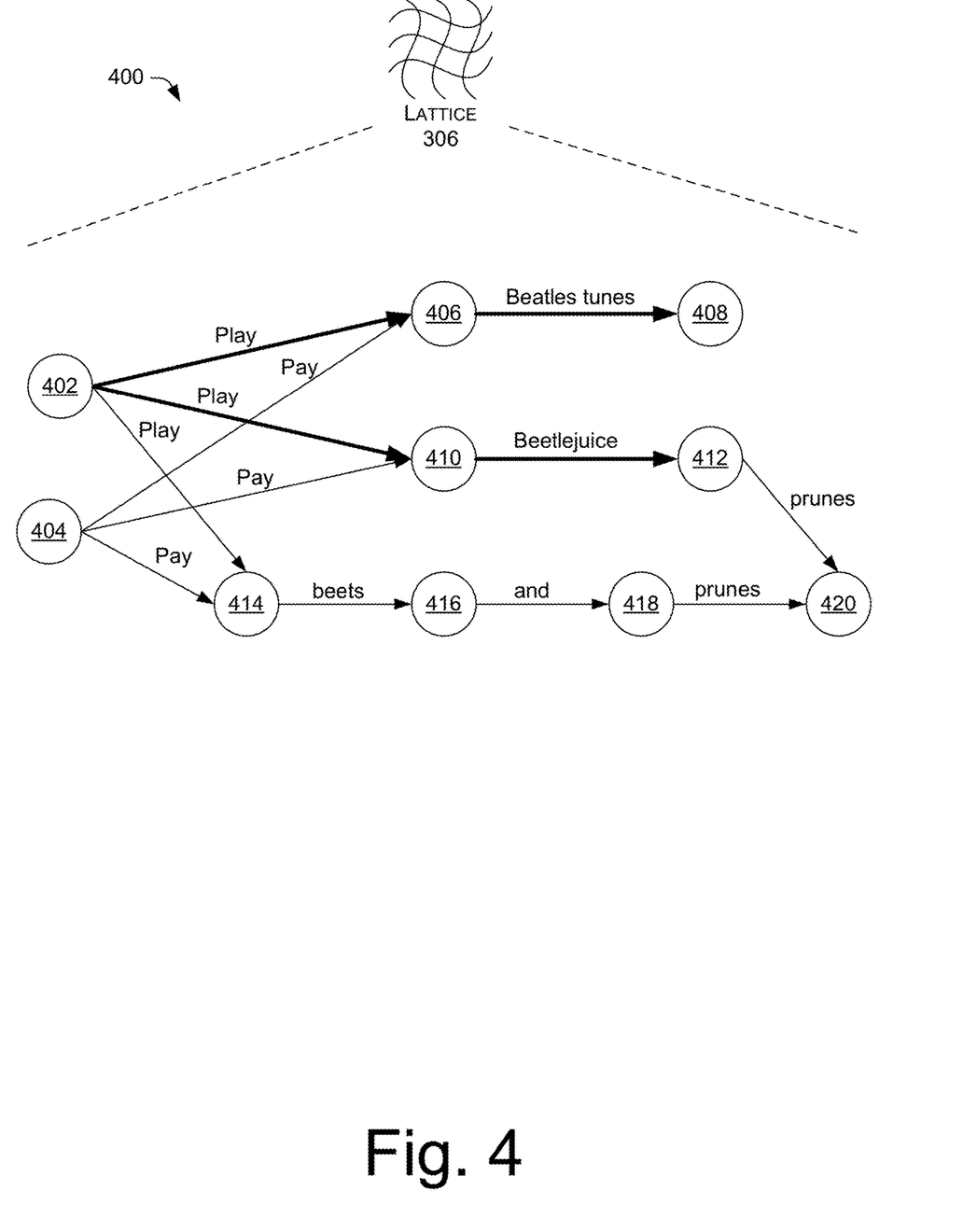
FIG. 4 shows possible commands found within a lattice derived from voice input.

In some embodiments, the speech recognition module 110 may output a lattice 306 that includes multiple possible word strings. An example of a lattice is shown in FIG. 4. A lattice may be a directed acyclic graph where the arcs are associated with recognized words (or parts of words) in the word strings and the words are joined at nodes. Each arc may be associated with a probability that the word associated with the arc is a correct word, and each path through the lattice may correspond to a word string.

The output from the speech recognition module 110, as the lattice 306 or otherwise, may be sent to the command router 108. The command router 108 includes an a priori application probability module 308 that determines for the applications 114-120 on the device 100 a context-based probability that the respective applications are the target for the next command. The a priori probability calculation is made without considering the content of the command but is based on information that is known before the command is received. The calculation may be made before or after the command is received. In a basic case, each application may have an equal probability of being the target for a subsequent command. In this example with four applications, each application may have a 25% likelihood of being the target of the next command. However, the command router 108 may modify the likelihood for any application based on a context such as the command history 122, the user profile(s) 124, and/or an environmental context. For example, applications that have been accessed recently in the command history 122 may be considered more likely to be the target of a command. If the user has been recently interacting with the movie player 116 to view a movie, even before a command is received, the command router 108 may assume that whatever command comes in next is more likely to be directed to the movie player 116 than any other application.

The user profiles 124 allow the command router 108 to identify a most likely application for receiving the next command based on information about a specific user. The current user of the device 100 may be identified by user login, by recognition of the user's voice, or via any other technique that identifies to a computing device the identity of a specific individual who is providing commands to the computing device. For example, if "Jeff" is identified as the current user and Jeff's user profile indicates that he only infrequently uses the device 100 for shopping, then the probability that the personal shopper 120 will receive the next command is decreased.

The environmental context may include everything the device 100 "knows" about its surrounding environment. Some information may be obtained by the device 100 directly through its own input and sensing devices such as the microphone 130. Other information may be obtained over a network connection. For example, upon detecting the sound of a telephone ringing, the device 100 may recognize that it frequently receives commands to decrease or mute output volume after the telephone ring is detected in the environment. If the music player 114 is the only active application that is generating an audio output, the probability of the next command being directed to the music player 114 will increase.

The command router 108 may also adjust a priori application probabilities based on combinations of the command history 122, the user profile(s) 124, and the environmental context. For example, if the profile of a given user indicates that he or she does not watch movies on weekday mornings, and the current time (i.e., environmental context) is 8:30 AM on a Tuesday then the probability of the movie player 116 receiving the next command decreases.

The command router 108 may also include a universal background model to distinguish speech representing a command from speech that is not intended for the device 100. For example, the audio environment detected by the microphone 130 may include speech from people in the room with the device 100 but not talking to the device 100, speech from radio, television, or other sources. The universal background model may incorporate a Gaussian mixture model to recognize speakers (e.g., distinguish a known user from a voice on television) and to identify speech that has a low probability of being directed to the device 100 based on context.

The module 308 for determining a priori probabilities for each of the applications may continually make that determination so that any point in time each of the applications is assigned a continually updated probability of being the target for the next command In other implementations, the module 308 may only determine the likelihood of the respective applications of receiving next command once a command is received. However, in either implementation, the calculations are performed a priori and without considering the specific command to be routed to an application.

The commander router 108 may also include a routing selection module 310. The routing selection module 310 may ultimately decide which application receives and processes an incoming command. Thus, rather than the user 302 selecting an application as the active application, the routing selection module 310 may activate one of the available applications so that it becomes the active application and receives the incoming command. The routing selection module 310 may provide the command to some or all of the applications 114-120 in order to receive a score from the respective applications indicating how well the command fits with the functionalities that each of the applications 114-120 can provide. This is shown by the arrows going from the command router 108 to each of the applications 114-120. At this point some or all of the applications may be presented with the command in order to evaluate their respective abilities to act on the command, but the applications are not yet requested to act on the command as a command.

When the command is provided as voice input 304, the lattice 306 may be provided to the respective applications for each to evaluate what commands can be found within the possible word strings represented by the lattice 306. Thus, rather than the command router 108 deciding which word string is the best interpretation of the lattice 306, the lattice 306 itself—including all the possible interpretations and relative probabilities of those interpretations—is passed to the applications. For example, a banking application may find the command "pay" in the lattice 306 while a media player application may find the command "play" in the same lattice 306. In this implementation, the lattice 306 is shown as being passed through the command router 108 before being received by the respective applications, but the lattice 306 may also be provided to the applications without going through the command router 108.

Some or all of the applications may include a priori command probabilities modules 312 that determine the likelihood of individual commands from multiple available commands as being the next command received by the respective application. Similar to the a priori application probabilities module 308, the a priori command probabilities module 312 determines, without considering a specific incoming command, relative probabilities of various commands as being the next command direct to the application. Thus, out of all the commands that an application can respond to, some commands may be more likely than others. The a priori command probabilities module 312 may determine probabilities continually in real time or it may determine a priori probabilities when a command is received.

As an illustrative example, assume that the music player 114 can respond to only four commands: play, stop, fast forward, and rewind. If the music player 114 is not currently playing an audio file then the "play" command is much more likely to be the next command received as compared to any of the other three commands. However, if the music player is currently playing music, then receiving a "play" command is much less likely. "Stop" may be the most likely command followed by "fast forward." The a priori command probabilities modules 312(1) for the music player 114 (or for any application) may assign probabilities to the available commands based on the command history 122 of commands for the application, the user profile 124, and/or the environmental context (e.g., if a phone is ringing "stop" may be the most likely command).

Each application may also include a command scoring module 314 that determines a degree of matching between the words in the lattice 206 and commands that a given application can interpret. Once the lattice 306 representing the command, is received by the applications on the device 100, each application may decide if it can act on a command in the lattice 206. For voice input, as well as other natural language inputs (e.g., text, etc.), there may be ambiguity regarding how to map the natural language input to a specific command. For example, if the music player 114 receives a natural language input "Play Beatles tunes" the music player 114 may determine that the command "play" matches 100% with a command it understands, but fail to find a music file with the title "Beatles tunes." The command scoring module 314(1) may identify multiple music files that list the "Beatles" as the artist. Out of all the songs by the Beatles, there may be one that has been most recently played, another that is most frequency played, and so forth. Thus, the command scoring module 314(1) may determine that it can play a Beatles song, but it does not know which specific song to play so the fit of that command with the functions of the music player 114 may be, for example, only 90%.

Although voice input is one type of natural language input, other inputs such text or handwriting may be natural language inputs that contain commands and can be analyzed by the command scoring module 314. For all types of natural language inputs, there may be no lattice 106 and the input to the command scoring module 314 may be in a different format or use a different data structure. However, processing by the command scoring module 314 will be substantially similar as in the example provided above.

The command scoring modules 314 may use various techniques to determine a score for how well a command fits with an application. Different applications may have scoring modules that apply different techniques, algorithms, etc. For example, the way the command scoring module 314(1) for the music player 114 determines a score for a prospective command may be different from how the command scoring module 314(3) of the timer 118 determines command matching scores.

The command scoring modules 314 may each include a model for interpreting a prospective command. Thus, given a command, an application, can return to the command router 108 a score representing the likelihood that the command was intended for the application. The return of these respective scores to the command router 108 is shown by the arrows going from the applications 114-120 to the command router 108. Although, this example shows each of the music player 114, the movie player 116, the timer 118, and the personal shopper 120, as including a command scoring module 314, the device 100 may include one or more applications that are not able to score a prospective command. For example, the device 100 may include a system tools application that only acts on commands when specifically directed to the system tools (e.g., the user 202 says "System tools: open network setup" to send a command to the system tools).

The modules that determine a priori probabilities, the a priori application probabilities module 308 and the a priori command probabilities module 312, as well as the command scoring module 314 may be trained using any techniques known to one of skill in the art. In some embodiments, machine learning techniques may be used. Based on past situations encountered by the device 100 and actions taken by the user 302 in those situations, the modules that determine a priori probabilities can improve their predictive accuracy. Similarly, the command scoring module 314 can improve its ability to classify an input as matching or not matching an available command in response to training. The training may be explicit such as controlled training that occurs during a set-up or device activation processes. The training may also be informal training that occurs while the device 100 is used. Specific machine learning techniques that implement the training may include use of a maximum entropy classifier/model, logistic regression, an exponential model, an n-gram model to recognize patterns of sequences, and the like.

The command scoring module 314 may use fuzzy matching to calculate a score for a command. Fuzzy matching identifies less-than perfect matches between words in the natural language input and entries in a commands database for the application. The fuzzy matching may be based on analysis of word stems, reference to a thesaurus to identify different words with similar meanings, consideration of mispronunciations or typographical mistakes, and similar techniques. Fuzzy matching may also be applied to voice input to address acoustic fuzziness and to recognize mispronunciations using phonetic confusability scores. The entries in the commands database may include all the commands that an application is able to act on. Fuzzy matching may return the single match with the highest probability, all matches above a threshold probability, or only the highest match above a threshold probability. As one example implementation, the score returned to the command router 108 may be the fuzzy match score for the command that has the highest fuzzy match score, but if that highest score is less than an 85% match a score of zero is returned to the command router 108.

Statistical parsing may also be used by the command scoring module 314 to parse a natural language input and determine how well the input fits with recognizable commands. Each application may have grammar rules that are associated with probabilities. The grammar rules may be different for different applications. The grammar rules may define a set of valid sentences, which in this example, would be the set of valid commands for a given application. The grammar may also include an open vocabulary that is not constrained by a closed set of grammar rules. Each grammar rule may be associated with a probability that provides the relative frequency of that grammar rule and, by deduction, the probability of a complete parse for the natural language input can be determined by the command scoring module 314. The probability associated with a grammar rule may be induced, but the application of that grammar rule within a parse tree and the computation of the probability of the parse tree based on its component rules is a form of deduction. Using this concept, statistical parsing searches over a space of all candidate parses, and the computation of each candidate's probability, to derive the most probable command for a natural language input. The expectation maximization algorithm is one method of searching for the most probable parse. In some implementations, the grammar rules may be represented by a probabilistic language model such as a Markov model or an n-gram model.

The scores returned from the command scoring modules 314 of the respective applications may be modified by the a priori command probabilities modules 312 in those same applications. Thus, a command that might otherwise receive score of 8 may be increased or decreased based on the context. For example, both the music player 114 and the movie player 116 can act on the command "stop." This command is a good fit (e.g., scores an 8) for both applications. However, if the movie player 116 is playing a movie then the a priori command probabilities module 312(2) may indicate that the likelihood of receiving a command to stop is higher than the other possible commands. The command scoring module 314(2) of the movie player 116 may raise the score from 8 to 10. Conversely, since the music player 114 is not currently playing music, receiving a "stop" command is less likely that it would be otherwise so the influence of the a priori command probabilities module 312(1) causes the command scoring module 314(1) to reduce the score from 8 to 6.

When the respective command scoring modules 314 return command match scores (with or without adjustment by the a priori command probabilities modules 312) to the command router 108, the routing selection module 310 may use those scores to determine which application offers the best "match" for the command comparison of the matching scores may be sufficient from the routing selection module 310 to identify which application should receive the command. For example, if the scores range from 0-10 and the command is "I want to buy shoes" then applications that cannot interpret this command such as the music player 114 and the timer 118 return scores of zero. The movie player 116 recognizes that there are some movie titles with the word "shoe" in the title so it returns a low score of 1. Because this command fits well with the functionalities provided by the personal shopper 120 that application returns the highest score of 10. Here, the personal shopper 120 is identified by the routing selection module 310 as the target application for the "I want to buy shoes" command.

Additionally, the probabilities of the applications of receiving the next command as determined by the a priori application probabilities module 308 may also be used to make a routing decision. The likelihood of the respective applications of being the intended target for the next command, no matter what that command is, combined with how well the actual command received matches each of the applications may be considered together by the routing selection module 310. Two applications may score a command the same, but it may be more likely that the next command is directed to one of those two applications.

For example, the command "How much time is remaining?" may fit with both the timer 118 and the movie player 116. However, in this example, the user 302 has not interacted with the movie player 116 for the last 90 minutes since playback of a move began, but the user 302 has used the timer 118 multiple times during the playback of the movie (e.g., using the timer 118 to assist with baking cookies while a movie plays in the background). Thus, the next command which in this example is the "How much time is remaining?" command is much more likely to be directed to the timer 118 than the movie player 112. Thus, the a priori application probabilities module 308 can function as a tie breaker when two or more applications report the same score to the command router 108. However, use of the a priori application probabilities module 308 is not limited to that of a tie breaker and the probabilities for any or all of the scores returned by the applications may be modified or considered in light of the a priori application probabilities.

FIG. 4 shows an illustrative representation 400 of possible commands found within the lattice 306. Here, the words, or parts of words, in the lattice 306 are shown as arcs that connect nodes in a directed acyclic graph. The words contained in the lattice 306 represent a word or phrase identified from the voice input 304 by the speech recognition module 110. Possible paths through the nodes of the lattice 306 are shown by arrows representing the arcs of the directed acyclic graph. Thicker arrows represent paths that have more than a threshold probability of being an accurate interpretation of the voice input 304. The first segment of the voice input may be interpreted as either "play" shown by the arcs leaving node 402 or interpreted as "pay" shown by the arcs leaving node 404. The next segment of the voice input may be interpreted as the phrase "Beatles tunes" between nodes 406 and 408 or the word "Beetlejuice" between nodes 410 and 412. An alternative detected by the speech recognition module 110 may include the three words "beets" between nodes 414 and 416, "and" between nodes 416 and 418 and "prunes" between nodes 418 and 420. The lattice 306 also includes a path in which "Beetlejuice" is followed by "prunes" which is represented by the arc between nodes 412 and 420. The paths through this lattice 306 that have more than the threshold probability of being accurate are "Play Beatles tunes" through nodes 402, 406, and 408 and "Play Beetlejuice" through nodes 402, 410 and 412.

Illustrative Probability Determination

Figure 5:
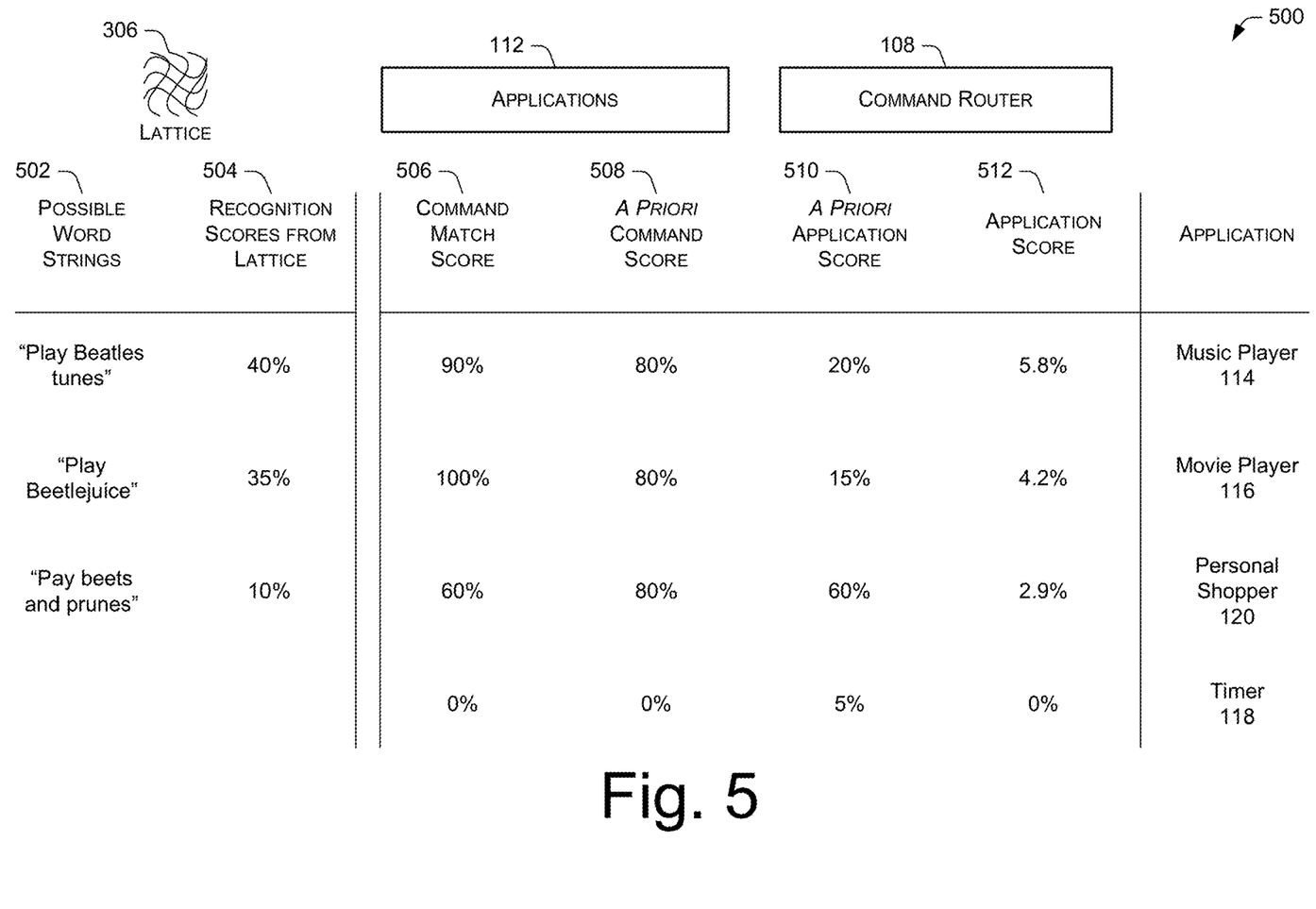
FIG. 5 shows an illustrative table of probabilities used to identify a target application.

FIG. 5 shows an illustrative table 500 of probabilities and calculation of a most likely target application based on multiple probabilities. A Bayesian probability estimate is one way to formulate the process of determining which application is most likely to be the intended target for an incoming command. Thus, the probability P of an application A being the target for a given command C can be represented as P(A|C). Bayes law provides that this probabilities is proportional to P(C|A)×P(A), where P(C|A) is the score (i.e., probability P) for the command C provided by the command scoring module 214 of application A, and P(A) is the a priori probability P of the application A provided by the a priori application probabilities module 208. The probability of a given application being the target for the next command, P(A), identified by the a priori application probabilities module 208 represents a prior probability distribution, often called simply the prior, of an uncertainty about P (e.g., the probability this application will receive a command) before the "data" (e.g., the scores provided by the commands scoring modules 214 after evaluating a given command) is taken into account. The probabilities provided by the a priori command probabilities modules 212 are also "priors" representing the likelihoods of various commands being the next command received by an application.

This table 500 shows the lattice 306 generated from voice input 204 and the first two columns of the table 500 show information derived from the lattice 306. The first column lists possible word strings 502 and the second column shows recognition scores from the lattice 504 for those word strings. In table 500, all of the scores are represented as percentages. However, the use of a percentage is but one non-exclusive way to represent a score. This portion of the table 500 applies specifically to voice input 304, but the remainder of the table is equally applicable to other types of natural language input such as typed text, handwritten commands, etc. In this example, the voice input 304 from the user 302 is processed by the speech recognition module 110 into a lattice 306 that includes some ambiguity. The possible word strings 502 found in the lattice 306 include "Play Beatles tunes," "Play Beetlejuice," and "Pay beets and prunes," as well as other less probable word strings that are not shown. The recognition scores from the lattice 504 for each of these word strings representing how likely the respective words strings are accurate interpretations of the voice input 304 are 40%, 35%, and 10%, respectively.

The rows of the table 500 represent the applications 112 available on the device 100 which are, in this example, the music player 114, the movie player 116, the timer 118, and the personal shopper 120. In some implementations the lattice 306 is provided to each of the applications 112, so the rows in the list of possible word strings 402 and the corresponding recognition scores from the lattice 504 are applied to each application 114-120.

The next two columns show information provided by the applications 112 available on the device 100. The command match score 506 may be generated by the command scoring module 314 and the a priori command score 508 may be generated by the a priori command probabilities module 312. Here, the music player 114 has a 90% match with the command "Play Beatles tunes" from the lattice 306 because there are songs by the Beatles available to play, but it is unclear exactly which song should be selected. The movie player 116 provides a 100% match score to a different word string, "Play Beetlejuice," because that matches the title of a 1988 movie. The personal shopper 120 has a 60% match with "Pay beets and prunes" because "pay" is interpreted as being close to "pay for" which approximately matches the command "purchase." However, the command history 122 shows that the personal shopper 120 application has never been used for buying fruits and vegetables so the match score is reduced. The timer 118 is unable to identify any possible word string 502 from the lattice 306 that matches commands for the timer 118 so it returns a match score of zero.

The a priori command score 508 column represents the prior probability of the command matched in the previous column as being the next incoming command. Thus, for the music player 114, the probability of receiving a "play" command relative to other commands is 80%. The probabilities of the movie player 116 receiving a "play" command and the personal shopper 120 receiving a "purchase" command are also 80%. Since the timer 118 has not identified any recognizable commands in the lattice 306, the probability of receiving the command referenced in the command match score 506 column is also zero.

The next two columns represent probabilities identified by the command router 108. The a priori application score 510 may be determined by the a priori application probabilities modules 308. In this example, the current context (e.g., time of day, day of week, date, recent command history) indicates that there is 60% likelihood that the next command will be directed to the personal shopper 120. The music player 114 has a 20% chance of being the application to receive the next command while that probability is 15% for the movie player 116. It is unlikely that the timer 118 would receive a command at this time so the probability for that application is 5%. In this example, the total of the a priori application score 510 is 100% since this device 100 only includes four applications and the next command will be directed to one of those applications.

The application score 512 column represents the calculations by the routing selection module 310 as to the relative likelihood that each of the respective applications 114-120 is the target for the command. The table 500 shows the application scores based on the product of the recognition score from the lattice 504, the command match score 506, the a priori command score 508, and the a priori application score 510. Thus, for the music player 114 the product of 40%×90%×80%×20% is 5.8%. Although shown here as percentages, the scores discussed in this disclosure may also be represented as probability values ranging from 0 to 1 or by a value varying along any other numerical range. The application score 512 for the other applications is calculated in a similar manner. Since the application score 512 for each of the movie player 116, the timer 118, and the personal shopper 120 is lower than that for the music player 114, the command "Play Beatles tunes" is routed to the music player 114.

This example shows the application score 512 as based on the product of each of columns 504, 506, 508, and 510; however, in other implementations any one, two, or three of these values may be used without incorporating all four into the final probability of which application is the most likely target. If the natural language input is a text string (e.g., a text message such as SMS) the information derived from the lattice 306 would not apply. If one or more applications lacks an a priori command probabilities module 312 then the a priori command score 508 column may be omitted from the calculation.

In many cases only one application, here the music player 114, is the "winner" and that application alone acts on the command. However, it is equally possible for the command router 108 to direct the command to multiple applications. Thus, there may be a one-to-many mapping of a single command to multiple applications. For example, the user 202 may be engaging in a timed game with the device 100 while using the device 100 to play music and the command "pause" may be appropriately applied to both game and music applications. A command may be applied to multiple applications based on context (e.g., command history 122 and/or user profiles 124 indicating that this user often pauses both applications at the same time), based on application score 512 values, due to interpretations of a command by the command router 108 (e.g., the command "stop everything" is interpreted as the command router 108 as being applied to more than one application), or for other reasons. The application score value 512 may indicate that multiple applications should all receive the command when the values are the same, within a threshold level of each other, or are all above a threshold level.

The command router 108 may alternatively decide to not route a command to any of the available applications. This may occur if there is ambiguity about which application is the correct target (e.g., application score 512 values that are the same or within a threshold amount) or if no application is likely (e.g., the application score 512 for every application is below some threshold value such as 1%). In these types of situations the command router 108 may return an error or query the user 102 for additional information. For example, based on the results shown in this table 500, the command router 108 could ask the user 102 if he wanted to listen to a song by the Beetles or watch the movie Beetlejuice.

Illustrative Process

Figure 6:
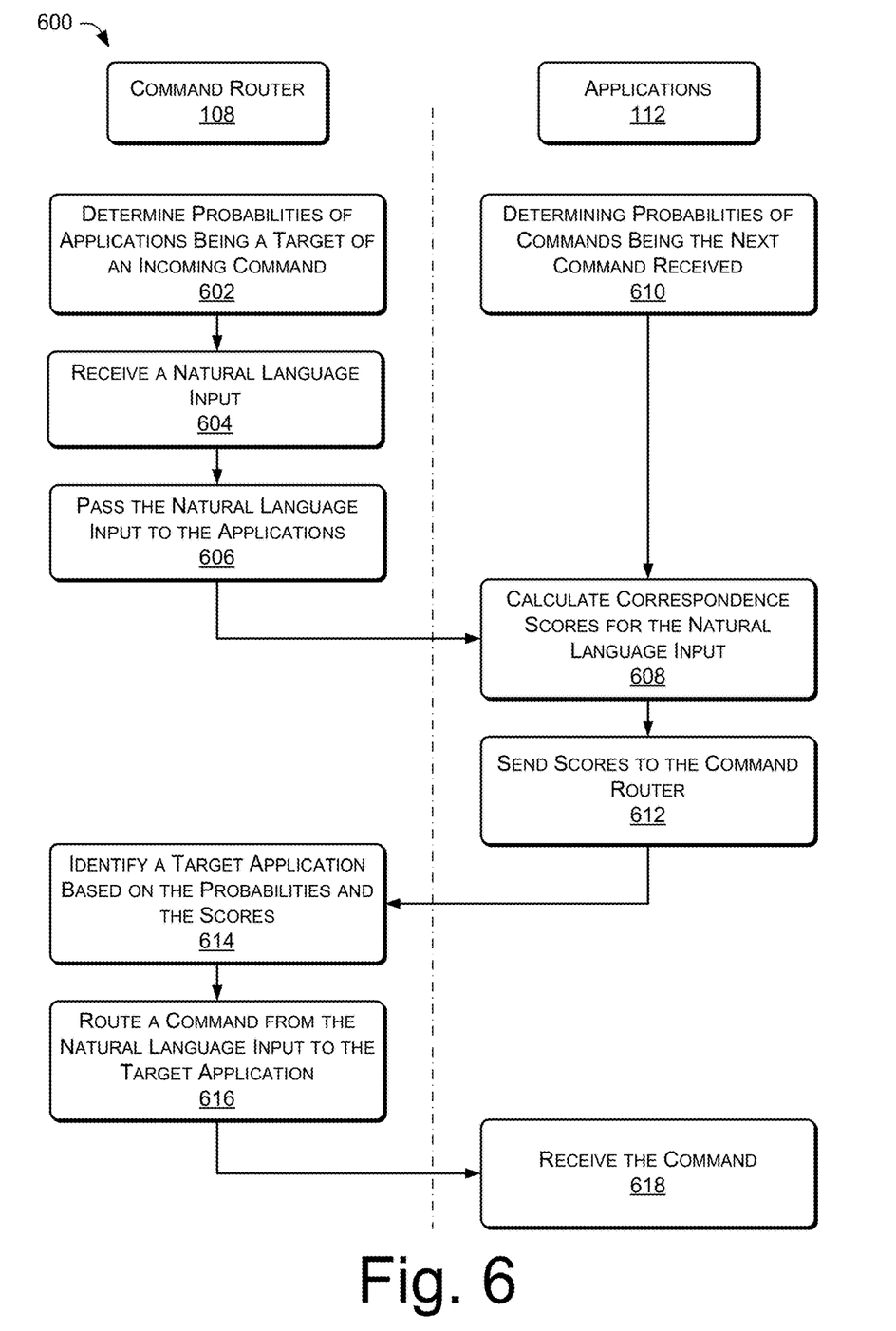
FIG. 6 is a flow diagram showing an illustrative process of identifying a target application for a command.

FIG. 6 shows an illustrative process 600 of identifying a target application for a command. The process 600 may be implemented by the voice controlled device 100 described herein, or by other devices. This process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

For purposes of describing one example implementation, the blocks are arranged visually in FIG. 6 in columns beneath the command router 108 and applications 112 to illustrate what parts of the device 100 may perform these operations. That is, actions defined by blocks arranged beneath the command router 108 may be performed by the command router 108, and similarly, actions defined by blocks arranged beneath the applications 112 may be performed by one or more applications.

At 602, probabilities of applications being a target on an incoming command are determined. These probabilities may be determined a priori without knowledge of the command or of a natural language input representing the command. An application that is more likely to be the recipient of whatever command comes next has a higher probability than an application that is less likely to receive the next command.

At 604, a natural language input is received. The natural language input may be a voice input, a text input, a handwriting input, or any other type of natural language input. The natural language input may represent a command that can be determined by processing the natural language input. For example, a lattice of word strings derived from a voice input may contain a word string that can be interpreted as a command for an application. The natural language input may be received by either or both of the command router 108 and the applications 112.

At 606, the natural language input is passed from the command router 108 to the applications 112 if the applications 112 have not already received the natural language input. FIG. 3 includes an illustration of this by showing the arrows going from the command router 108 to each of the applications 114-120.

At 608, matching scores for the natural language input received at 604 are calculated. The scores represent a degree of correspondence between a command contained within the natural language input and commands recognized by the respective applications. In some implementations, each of the applications 112 may calculate its own score for the command.

At 610, a probability that a command will be a next command received by the application is determined. The probability may compare each command to all the other commands that the application can recognize. This a priori likelihood is calculated without knowledge of the natural language input received at 604. A context for the application may be used to assign probabilities to one or more commands. The context may include past commands received by the application, a user profile, or environmental factors such as what other applications are also active. The probability from 610 may increase or decrease the matching score calculated at 608. Generally, a higher probability of a command being the next command will increase the matching score for a natural language input containing that command and the opposite will occur if a command is less likely to be the next command.

At 612, once the scores are calculated at 608, the scores are sent from the applications 112 to the command router 108. This is shown in FIG. 3 by the arrows going from the applications 114-120 to the command router 108.

At 614, a target application to route the natural language input is identified by the command router 108 based on the scores from 608 and the probabilities from 602. The identified target application may be the application that has a highest product of the matching score from 608 and the probability from 602.

At 616, the command router 108 routes the natural language input as a command to the target application. Once an application is identified as the, or one of the, target application(s) then the command may be sent to the application as a command.

At 618, the command is received by the application that is identified as the target application.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A voice controlled system comprising:
one or more processors;
one or more computer-readable media accessible by the one or more processors, the one or more computer-readable media storing:
a first application executable by the one or more processors; and
a second application executable by the one or more processors;
a speech recognition subsystem to:
receive audio data generated by an electronic device; and
generate first text data from the audio data; and
a routing subsystem to:
determine a word represented by the first text data;
determine that second text data also represents the word, the second text data associated with a first group of commands that the first application can process;
determine, based at least in part on the second text data also representing the word, a first score for the first application, the first score indicating a first correspondence between the first text data and the second text data;
determine a second score for the second application, the second score indicating a second correspondence between the first text data and third text data, the third text data associated with a second group of commands that the second application can process; and
determine the first application to receive a command associated with the first text data based at least in part on the first score and the second score.

2. The voice controlled system of claim 1, wherein the audio data is represented by the speech recognition subsystem as a lattice of possible word strings.

3. The voice controlled system of claim 1, wherein the routing subsystem is further to launch the first application as a cloud-based application.

4. The voice controlled system of claim 1, wherein the routing subsystem is further to:
determine a third score representing a first likelihood that the first application is an intended target for an additional command; and
determine a fourth score representing a second likelihood that the second application is the intended target for the additional command.

5. The voice controlled system of claim 1, wherein the first score is further based at least in part on a user profile.

6. The voice controlled system of claim 1, wherein the routing subsystem is further to:
determine that the first score is greater than the second score,
wherein to determine the first application to receive the command is based at least in part on the first score being greater than the second score.

7. A method comprising:
receiving audio data from an electronic device;
generating first text data based at least in part on the audio data;
determining a first application from a plurality of applications;
determining a second application from the plurality of applications;
determining a word represented by the first text data;
determining that second text data also represents the word, the second text data associated with a first group of commands that the first application can process;
determining, based at least in part on the second text data also representing the word, a first score indicating a first correspondence between the first text data and the second text data;
determining a second score indicating a second correspondence between the first text data and third text data, the third text data associated with a second group of commands that the second application can process; and
sending an output to the electronic device according to the first score and the second score.

8. The method of claim 7, further comprising representing the audio data as a lattice of possible word strings.

9. The method of claim 7, further comprising:
receiving a third score representing a first likelihood that the first application is an intended target for a command; and
receiving a fourth score representing a second likelihood that the second application is the intended target for the command.

10. The method of claim 7, further comprising: identifying a ranked list of possible applications including the first application and the second application.

11. The method of claim 7, further comprising:
determining a state of the first application,
wherein the determining the first application is based at least in part on the state.

12. The method of claim 7, further comprising:
determining a history of commands implemented by the first application,
wherein the determining the first application is based at least in part on the history of commands.

13. The method of claim 7, further comprising:
storing a user profile associated with the first application,
wherein the determining the first application is based at least in part on the user profile.

14. The method of claim 7, further comprising:
determining an environmental context of the electronic device,
wherein the determining the first application is based at least in part on the environmental context.

15. The method of claim 7, further comprising launching the first application as a cloud-based application.

16. The method of claim 7, wherein:
the determining the second score for the second application comprises at least:
determining that the third text data does not represent the word; and
determining, based at least in part on the third text data not representing the word, the second score for the second application; and
the method further comprises determining that the first score is greater than the second score.

17. The method of claim 7, wherein:
the determining the second score for the second application comprises at least:
determining that the third text data also represents the word; and
determining, based at least in part on the third text data also representing the word, the second score for the second application; and
the method further comprises determining that the first score is greater than the second score.

18. A method comprising:
receiving audio data from an electronic device;
generating first text data based at least in part on the audio data;
determining, from a plurality of applications, a first application;
determining, from the plurality of applications, a second application;
determining that the first text data represents one or more words;
determining a command based at least in part on the one or more words;
determining that a first group of commands, which the first application can process, includes the command;
determining, based at least in part on the first group of commands including the command, a first score for the first application, the first score indicating a first correspondence between the first text data and second text data, the second text data associated with the first group of commands;
determining a second score for the second application, the second score indicating a second correspondence between the first text data and third text data, the third text data associated with a second group of commands that the second application can process; and
determining the first application to receive the command based at least in part on the first score and the second score.

19. The method of claim 18, further comprising:
determining that the first text data represents a command; and
based at least in part on the first score and the second score, sending the command to the first application.

20. The method of claim 18, wherein:
the determining the second score for the second application comprises:
determining that the second group of commands does not include the command; and
determining, based at least in part on the second group of commands not including the command, the second score for the second application; and
the method further comprises determining that the first score is greater than the second score.

21. The method of claim 18, wherein:
the determining the second score for the second application comprises:
determining that the second group of commands includes the command; and
determining, based at least in part on the second group of commands including
the command, the second score for the second application; and
the method further comprises determining that the first score is greater than the second score.

* * * * *